UNITED STATES PATENT OFFICE.

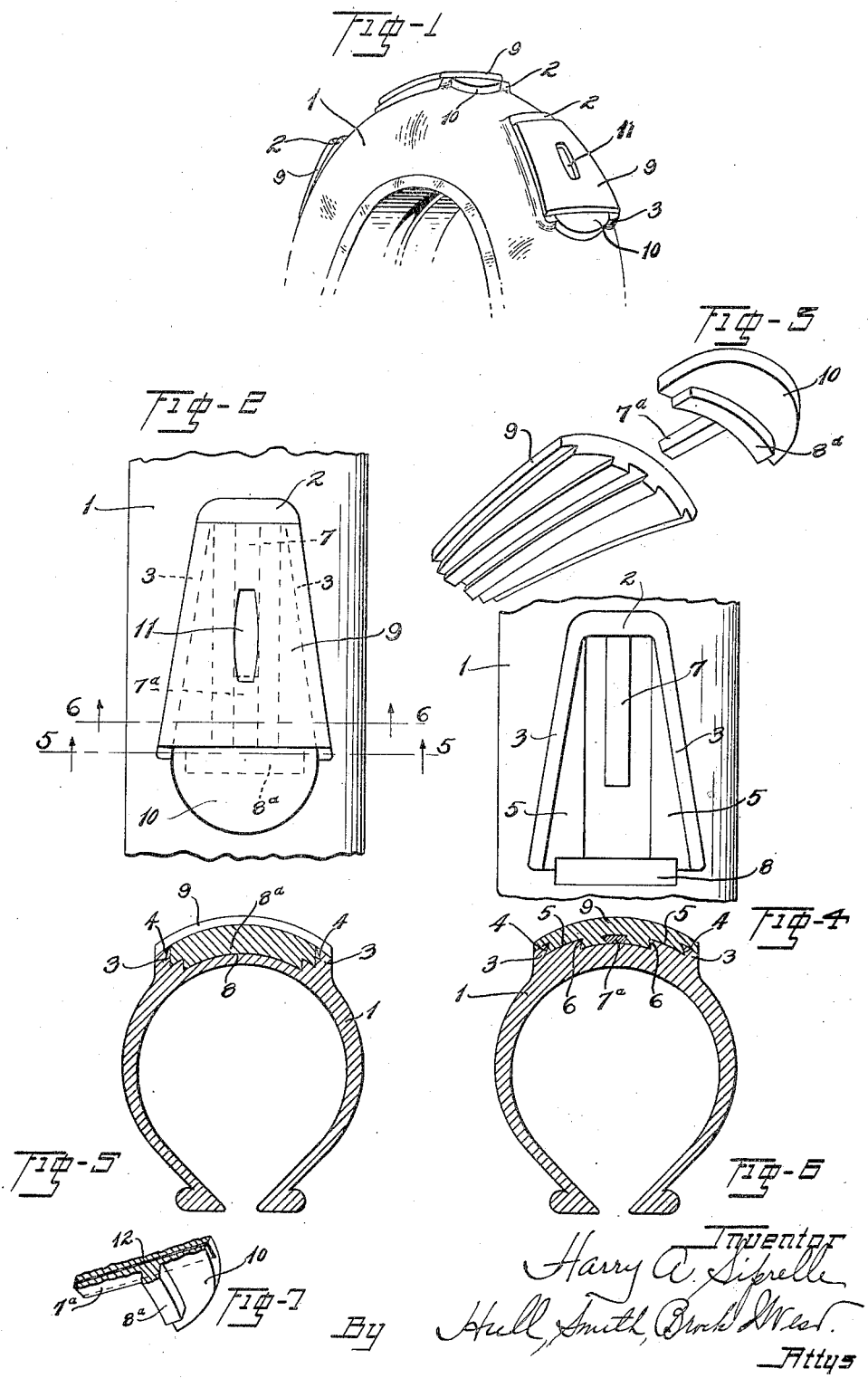

HARRY A. SIPRELLE, OF CLEVELAND, OHIO.

TIRE.

1,346,346.  Specification of Letters Patent.  Patented July 13, 1920.

Application filed November 6, 1919. Serial No. 336,110.

*To all whom it may concern:*

Be it known that I, HARRY A. SIPRELLE, a citizen of the United States, residing at Cleveland, in the county of Cuyahoga and State of Ohio, have invented a certain new and useful Improvement in Tires, of which the following is a full, clear, and exact description, reference being had to the accompanying drawings.

This invention relates to vehicle tires and more particularly to the tread or tracking portions of such tires.

The objects of my invention are to provide a novel and easily renewable tread portion which may be detachably applied to the tire so as to be readily removed therefrom when worn and it is desired to substitute a new tread; to provide a simple and effective means for locking the renewable tread in place, while further objects and advantages will appear as the description proceeds.

In the accompanying drawing wherein I have shown an illustrative embodiment of my invention, Figure 1 is a perspective view of a portion of the tread of a pneumatic tire with my invention applied thereto; Fig. 2 is a detail edge view of a tire with the renewable tread block in place; Fig. 3 is a perspective view of the renewable tread block and fastening block; Fig. 4 is an edge view of the receiving portion of a tire which is adapted to receive the tread block; Figs. 5 and 6 are sections taken on the lines 5—5 and 6—6, respectively of Fig. 2; and Fig. 7 is a sectional perspective view of a modification of my fastening block.

Describing the various parts by reference numerals, 1 indicates the body portion of a pneumatic tire which has molded about its outer periphery or tread a series of receiving portions or seats 2, each adapted to receive a removable tread block. Each receiving portion is identical so that a description of one will suffice for all. The receiving portion or seat includes a substantially V-shaped rib member 3 which is preferably undercut along its inner edge as indicated at 4. A tapered surface 5 extending inwardly from each side of the undercut surface 3 is also undercut on its inner edge as indicated at 6, and a dove tailed member 7 extends from the converging end of the V-rib to a predetermined point in the depression formed by such undercutting. At the diverging end of the V-rib there is formed a transverse depression 8, the purpose of which will be explained later.

By referring to Fig. 3 it will be seen that the renewable tread block 9 is formed on its under surface with a series of coöperating ribs and grooves so that it may be slid into position on the receiving portion of the tire. A locking portion 10 is shown as provided with a tongue portion 7ª which when in place forms a continuation of the rib 7 and there is also provided a transverse lug portion 8ª which is adapted to fit in the depression 8 and thereby hold the tread block into engagement with the receiving portion. The outer face of the tread block may be provided with suitable anti-skid depressions 11 if desired.

The numerous undercut portions of my tread block and the receiving portion of the tread serve to distribute the side and end thrusts over a large area and thereby minimize the tendency of the block to become disengaged from the receiving portion. The tire is driven in a direction such that the friction of the road tends to force the tread blocks toward the converging end of the receiving portion and this movement is limited by the friction of the converging undercut surfaces and also by the transverse end of the V-rib 3. When the machine is backing, thereby reversing these forces the rib 8ª seated in the depression 8, and the friction of the numerous surfaces of the rib prevent the tread block from becoming disengaged. When the tread blocks have been worn down and it is desired to renew them, the locking member 10 may be removed and the worn tread block disengaged from the receiving portion and new parts substituted therefor.

If desired the locking member 10 may have a piece of spring metal embedded therein as shown at 12, Fig. 7. This will serve to stiffen the member and hold the lugs 7ª and 8ª more rigidly into contact with their respective depressions.

While I preferably form the tread blocks and locking member from rubber it will be understood that either or both of said parts may be made of metal, in which case, a particularly effective anti-skid surface is afforded.

Having thus described my invention, what I claim is:—

1. A tire having molded therein pairs of ribs, the ribs of each pair being arranged on opposite sides of the central portion of the tire and converging circumferentially of said tire, and blocks removably fitted between said ribs.

2. A tire having molded therein pairs of ribs, the ribs of each pair being arranged on opposite sides of the central portion of the tire and converging circumferentially of said tire, a rib arranged centrally between the ribs of each pair, and blocks arranged to interlock with said ribs.

3. A tire having on its outer surface pairs of ribs extending circumferentially thereof and being inclined with respect to the central portion of the tire whereby a convergent channel is provided between each pair of ribs, said tire having a projection adjacent to the contracted end of each channel formed between a pair of ribs, a block adapted to be inserted between each pair of ribs and to interlock therewith, and additional means for securing each block in place.

4. A tire having on its outer surface a plurality of circumferentially spaced recessed seats and a stop projection adjacent one end of each seat, and a block adapted to be inserted within each seat, and additional means for securing each block in place.

5. A tire having at its outer surface circumferentially spaced recessed seats, a block adapted to be inserted within each seat, and a second block adapted to interlock with said first block and said recessed seat to hold said blocks in position.

6. A tire having at its outer surface circumferentially spaced recessed seats and a stop projection adjacent one end of each seat, a block adapted to be inserted within each seat and detachable locking means forming a stop projection adjacent the other end of each seat.

7. A tire having at its outer surface a plurality of circumferentially spaced recessed seats, each of said seats being composed of a plurality of undercut ribs disposed longitudinally of the outer surface of the tire, a stop projection adjacent the end of each seat and a block adapted to interlock with said ribs.

In testimony whereof, I hereunto affix my signature.

HARRY A. SIPRELLE.